Patented Nov. 9, 1937

2,098,334

UNITED STATES PATENT OFFICE 2,098,334

MANUFACTURE OF ALIPHATIC ANHYDRIDES

Henry Dreyfus, London, England

No Drawing. Application April 16, 1935, Serial No. 16,622. In Great Britain April 19, 1934

14 Claims. (Cl. 260—123)

This invention relates to the production of aliphatic anhydrides by thermal decomposition of the vapors of the corresponding acids.

According to the present invention acetic anhydride and other aliphatic acid anhydrides are produced by subjecting the vapor of the corresponding aliphatic acid to thermal decomposition in presence of meta-phosphoric acid produced by decomposing phosphates of volatilizable bases, i. e. phosphates of ammonia or volatilizable amines, under the action of heat.

It has been found that the meta-phosphoric acid produced by decomposing such phosphates under the action of heat is more advantageous as a catalyst in the production of aliphatic anhydrides by thermal decomposition of the vapor of the corresponding acids than are other phosphoric acids, for instance meta-phosphoric acid obtained by heating ortho-phosphoric acid.

As examples of phosphates which may be employed as a source of the meta-phosphoric acid used in the process of the present invention may be mentioned the primary, secondary and tertiary ammonium ortho-phosphates, the acid and normal hydrazine ortho-phosphates, and the ortho-phosphates of hydroxylamine, methylamines, ethylamines, cyclohexylamine and pyridine.

The decomposition of ammonium phosphates may be effected by heating, for instance to a temperature of 400 to 450° C., until no more, or practically no more, ammonia is evolved, which at the temperatures indicated usually takes about 4 to 5 hours, although when heated to higher temperatures, e. g. 500 to 550° C. the decomposition is effected more rapidly. Decomposition of the phosphates of volatilizable amines can be effected at even lower temperatures.

It should be remarked that the presence of a small quantity of undecomposed ammonium or amine phosphate is not detrimental to the action, as a catalyst, of the meta-phosphoric acid obtained, since, as described in U. S. Patent No. 1,883,353, non-metallic inorganic and organic bases and salts thereof are capable of assisting catalytically the process in question. On the other hand the presence of ortho-phosphoric acid together with the meta-phosphoric acid is to be avoided and in this connection it should be pointed out that the addition of a small quantity of sodium or other alkali metal meta-phosphate or other alkali compound has been found to remove or prevent the formation of ortho-phosphoric acid.

The catalyst of the present invention may be used together with other catalysts for the manufacture of anhydrides.

The thermal decomposition of the aliphatic acids may be carried out at any temperature capable of splitting the acids into their anhydrides and water. Usually temperatures between about 300° C. and 900° C. may be employed, temperatures between 600 and 800° C. being particularly suitable.

The thermal decomposition of the aliphatic acids is preferably effected by passing the aliphatic acid vapor in a stream through the meta-phosphoric acid in liquid form and maintained at the desired temperature. However, if desired, the aliphatic acid vapor may be passed over or otherwise in contact with the meta-phosphoric acid carried upon solid supports, for instance silica or carborundum. Again, small quantities of the meta-phosphoric acid, preferably in admixture with liquid aliphatic acid, may be injected into the stream of aliphatic acid vapor being supplied to the thermal decomposition zone. This latter method of catalyzing the thermal decomposition of the aliphatic acid vapor may, if desired, be employed in conjunction with the processes indicated above, for instance a small quantity of the meta-phosphoric acid in acetic acid may be sprayed into a current of acetic acid vapor being fed into a hot bath of the liquid meta-phosphoric acid in which the thermal decomposition is effected.

The aliphatic acid vapor to be subjected to the thermal decomposition may with advantage be pre-heated, e. g. to a temperature approximately equal to or approaching the reaction temperature, prior to subjecting the same to the thermal decomposition with the aid of the meta-phosphoric acid catalyst.

The recovery of the anhydride produced from the vaporous products of the thermal decomposition is preferably effected by processes in which the anhydride is condensed whilst the water present is maintained in vapor form, for instance processes such as those described in U. S. Patents Nos. 1,735,957 and 1,735,959, and U. S. application S. No. 284,566 filed 11th June 1928, or by processes involving the removal of water vapor from the reaction products simultaneously with condensation, for instance processes such as those described in U. S. Patents Nos. 1,817,614, 1,931,687 or 1,915,573.

The invention may be applied to the manufacture of aliphatic anhydrides by the thermal decomposition of vapors of aliphatic acids generally; thus acetic anhydride may be produced from acetic acid while homologues thereof can be produced by decomposition of the corresponding acids e. g. propionic acid in the case of the production of propionic anhydride. Moreover, the invention may be applied to the treatment of substituted fatty acids to produce the corresponding anhydrides, e. g. by treatment of alkoxy fatty acids, for instance methoxy acetic acid, the corresponding alkoxy aliphatic anhydrides may be produced.

While the acids subjected to thermal decomposition are preferably employed in presence of not more than 25% by weight of water based on the acid, the invention may be applied to the production of aliphatic anhydrides from the vapors of aqueous acids containing still more water.

The following example illustrates the invention, but it is to be understood that this example is given solely by way of illustration and is in no way limitative:

*Example*

Secondary ammonium orthophosphate is heated to a temperature of 420–425° C. for a period of about 4½ hours, a small proportion, e. g. ½ to 1%, of sodium metaphosphate being mixed either with the original ammonium orthophosphate or with the phosphoric acid formed. The temperature of the catalyst mixture of metaphosphoric acid and metaphosphate is then raised to 680–700° C. A rapid current of the vapor of 95–96% acetic acid is passed through the hot catalyst mixture maintained at this temperature and the acetic anhydride formed is separated from the vaporous products of the thermal decomposition.

What I claim and desire to secure by Letters Patent is:—

1. Process for the manufacture of an aliphatic anhydride which comprises subjecting the corresponding aliphatic acid to thermal decomposition in presence of metaphosphoric acid produced by the thermal decomposition of a phosphate of a volatilizable base.

2. Process for the manufacture of an aliphatic anhydride which comprises subjecting the corresponding aliphatic acid to thermal decomposition in presence of metaphosphoric acid produced by the thermal decomposition of an ammonium phosphate.

3. Process for the manufacture of an aliphatic anhydride which comprises subjecting the corresponding aliphatic acid to thermal decomposition in presence of metaphosphoric acid produced by the thermal decomposition of an ammonium phosphate at temperatures of 400–450° C.

4. Process for the manufacture of an aliphatic anhydride which comprises subjecting the corresponding aliphatic acid to thermal decomposition in presence of metaphosphoric acid produced by the thermal decomposition of a phosphate of a volatilizable base and containing in admixture therewith an alkali metal compound capable of reacting with ortho-phosphoric acid.

5. Process for the manufacture of an aliphatic anhydride which comprises subjecting the corresponding aliphatic acid to thermal decomposition in presence of metaphosphoric acid produced by the thermal decomposition of an ammonium phosphate and containing in admixture therewith an alkali metal metaphosphate.

6. Process for the manufacture of an aliphatic anhydride which comprises subjecting the corresponding aliphatic acid to thermal decomposition in presence of metaphosphoric acid produced by the thermal decomposition of an ammonium phosphate at temperatures of 400–450° C., and containing in admixture therewith an alkali metal metaphosphate.

7. Process for the manufacture of acetic anhydride which comprises subjecting acetic acid to thermal decomposition in presence of metaphosphoric acid produced by the thermal decomposition of a phosphate of a volatilizable base.

8. Process for the manufacture of acetic anhydride which comprises subjecting acetic acid to thermal decomposition in presence of metaphosphoric acid produced by the thermal decomposition of an ammonium phosphate.

9. Process for the manufacture of acetic anhydride which comprises subjecting acetic acid to thermal decomposition in presence of metaphosphoric acid produced by the thermal decomposition of an ammonium phosphate at temperatures of 400–450° C.

10. Process for the manufacture of acetic anhydride which comprises subjecting acetic acid to thermal decomposition in presence of metaphosphoric acid produced by the thermal decomposition of a phosphate of a volatilizable base and containing in admixture therewith an alkali metal compound capable of reacting with orthophosphoric acid.

11. Process for the manufacture of acetic anhydride which comprises subjecting acetic acid to thermal decomposition in presence of metaphosphoric acid produced by the thermal decomposition of an ammonium phosphate and containing in admixture therewith an alkali metal metaphosphate.

12. Process for the manufacture of acetic anhydride which comprises subjecting acetic acid to thermal decomposition in presence of metaphosphoric acid produced by the thermal decomposition of an ammonium phosphate at temperatures of 400–450° C., and containing in admixture therewith an alkali metal metaphosphate.

13. A catalyst for the manufacture of aliphatic anhydrides by thermal decomposition of the corresponding aliphatic acids, comprising metaphosphoric acid produced by thermal decomposition of a phosphate of a volatile base and containing in admixture therewith an alkali metal compound capable of reacting with orthophosphoric acid.

14. A catalyst for the manufacture of aliphatic anhydrides by thermal decomposition of the corresponding aliphatic acids, comprising metaphosphoric acid produced by thermal decomposition of an ammonium phosphate and containing in admixture therewith an alkali metal metaphosphate.

HENRY DREYFUS.